Aug. 24, 1943.   J. W. WALLIS   2,327,571
PIPE COUPLING
Filed April 30, 1941   2 Sheets-Sheet 2
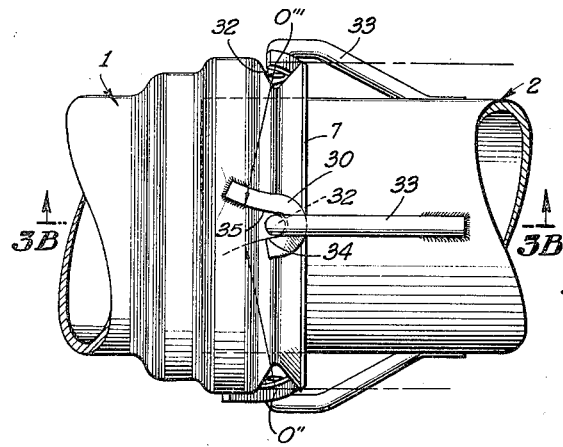
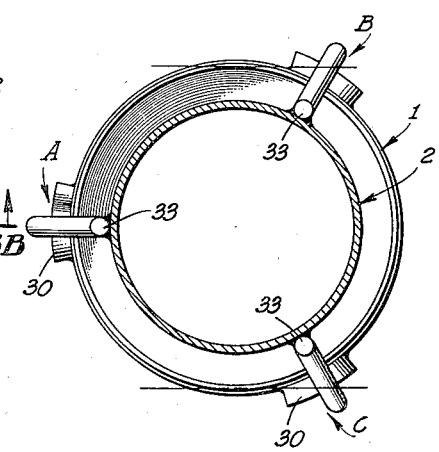
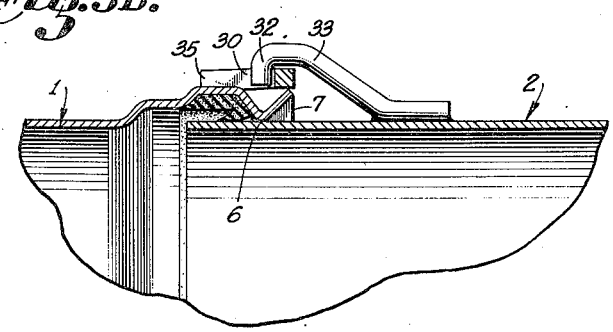
JOHN W. WALLIS,
INVENTOR
BY Lyon & Lyon
ATTORNEYS.

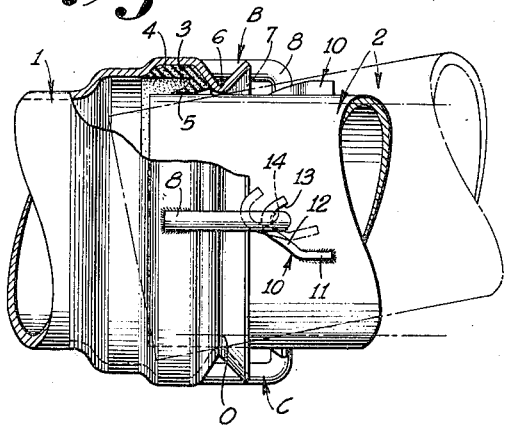
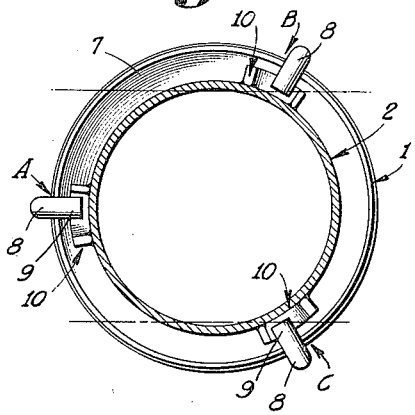
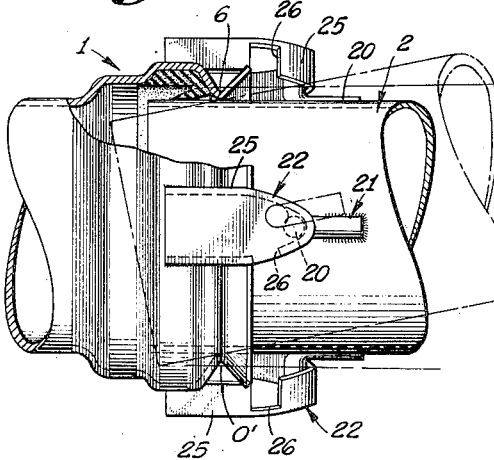
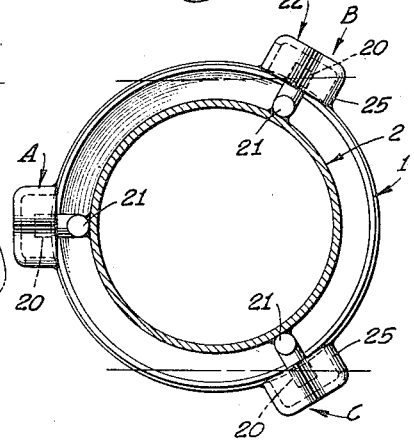

Patented Aug. 24, 1943

2,327,571

UNITED STATES PATENT OFFICE 2,327,571

PIPE COUPLING

John W. Wallis, Los Angeles, Calif.

Application April 30, 1941, Serial No. 391,031

1 Claim. (Cl. 285—175)

This invention relates to pipe couplings of the quick, detachable type, and particularly those employing rubber gaskets which permit a certain amount of angular movement without leakage. Couplings of this general type are old in the art, as disclosed in my Patents 2,067,428, issued January 12, 1937, and 2,132,769, issued October 11, 1938, respectively. The present invention is a further development of the couplings disclosed in my previous patents.

Couplings of the general type to which this invention relates, involve a pair of pipes to be coupled, one of which has an enlarged female end containing a flexible rubber gasket adapted to receive and seal about the male end on the other pipe. The particular construction of the pipe ends and the gasket for effecting a seal in angular as well as straight positions of the pipes, is substantially the same as in the prior patents referred to. The present invention differs from the prior known structures in the hitching elements employed to hold the two pipes against separating movement.

In my prior Patent No. 2,067,428, I have disclosed that the two pipes may be releasably held against separating movement by a female hitch element in the structural form of a circumferential lug on the male end, which is engageable with a male hitch element on the female end by simple inserting the male end of the pipe into the female end with the circumferential lug out of alignment with the male hitch element, and then rotating the pipe to carry the lug into engagement with the male hitch element, the lug having a stop member at one end for preventing movement of the male hitch element past the end of the lug, and for facilitating the coupling of the pipes by the sense of touch. This construction has the disadvantage that it does not lock the two pipes against relative rotation. It is desirable to prevent relative rotation between the two pipe sections for the reason that the pipes are often equipped with risers or sprinkler heads which should be maintained in vertical position, and if the couplings between the pipe sections permit even a small amount of relative rotation, the effect becomes cumulative in a long line and may permit a very objectionable rotary displacement of the section of the pipe containing a riser or sprinkler head.

In my second Patent No. 2,132,769, I further disclosed a construction in which the contacting surfaces of the hitch elements were disposed substantially in the transverse plane containing the axis about which the pipes swing during relative angular movement. The structure of the second patent has the advantage over that disclosed in the first patent in that the two pipe members are locked against relative rotation about their longitudinal axis. However, it is sometimes desirable to have a quickly connectible hitch which prevents relative rotation between the coupled pipes, without being restricted to a construction in which the contacting elements of the hitch lie in the transverse plane containing the center about which the pipes pivot for angular or bending movement.

An object of the present invention is to provide a hitch structure for interconnecting flexible-joint pipes without restriction to a construction in which the contacting elements of the hitch are positioned in the transverse plane containing the axis of bending movement, while at the same time preventing relative rotary movement between the coupled pipes.

Another object of the invention is to provide a hitch construction that reduces the longitudinal movement of the one pipe into and out of the other during bending or angular movement between the pipes.

Other more specific objects and features of the invention will become apparent from the following, detailed description of certain specific embodiments thereof, as disclosed in the drawings, in which Fig. 1 is a side elevation with portions broken away, of a pipe coupling in accordance with the invention;

Fig. 1A is an end elevation of the hitch structure shown in Fig. 1, the view being taken looking into the right end of Fig. 1, and showing the male pipe end in section;

Fig. 2 is a view similar to Fig. 1, but showing an alternative construction;

Fig. 2A is an end view of the structure shown in Fig. 2;

Fig. 3 is a side elevation, showing still another alternative hitch construction;

Fig. 3A is an end view of the hitch shown in Fig. 3; and

Fig. 3B is a detail, longitudinal section taken in the plane 3B—3B of Fig. 3.

Referring first to the construction shown in Figs. 1 and 1A, there is shown a pipe 1 having an enlarged end portion adapted to telescopically receive the end of a pipe 2. The enlarged portion of pipe 1 is shaped to define an annular trough or channel 3 for containing an annular rubber gasket 4 having a flexible lip 5 adapted to bear against and seal with the outer surface of the pipe 2 in all angular positions of the latter with respect to the pipe 1. Immediately in front of the channel 3 the pipe 1 is constructed to define an annular shoulder 6 which is only slightly larger than the external diameter of the pipe 2 and serves to support the pipe 2 with respect to the pipe 1 against lateral movement. Beyond the constricted portion 6, the pipe is flared outwardly to define a funnel-shaped guiding lip 7 which facilitates entering the pipe 2 into the pipe 1 and protects the shoulder 6 to a certain extent.

To support the pipes 1 and 2 against relative longitudinal separating movement while permitting free limited angular or bending movement, I provide two or more, preferably symmetrically circumferentially spaced, hitch assemblies. Each hitch assembly includes a male hitch member on the pipe 1 comprising a bar 8 extending longitudinally along the pipe and beyond the end thereof, with its extreme outer end bent down radially and inwardly to form a male hitch element 9. The bars 8 may conveniently be attached to the pipe by welding them to the pipe at its points of contact thereon, the latter being at the outer surface of the channel portion 3 and the edge of the lip 7.

Each hitch assembly also includes a V-shaped female hitch member on the pipe 2 comprising a female hitch element 10 which may be formed of strip metal bent to the desired shape and welded at its inner edge to the outer surface of the pipe 2. Each of the female hitch members 10 comprises a straight stop portion 11, an arcuate portion 12 which forms one side of the female hitch element proper, and an arcuate portion 13 which forms the other side of the female hitch element. When the pipe members are coupled and are extending straight with respect to each other, each of the male hitch elements 9 rests in the apex 14 formed at the junction of the two sides 12 and 13 of its associated female hitch member 10. It will be obvious that under these conditions the hitch elements are interhooked and there can be no relative rotation between the pipes 1 and 2 about their common axis without simultaneous, inward movement of the pipe 2 into the pipe 1. Such inward movement is normally prevented in practice by the fact that the pressure of the fluid in the pipe line tends to separate the pipe sections longitudinally. Furthermore, it is the usual and proper practice in intercoupling pipes of this type to first insert the pipe 2 into pipe 1 with the female hitch members 10 out of alignment with the male hitch members 9, then rotate the pipe 2 clockwise until one of the male hitch elements 9 strikes the portion 11 or 12 of the cooperating female hitch member, and then retract the pipe 2 sufficiently to cause the male hitch elements 9 to ride into the apexes 14 of the female hitch members 10.

A particular advantage of employing a plurality of the hitches 10 shaped as shown, is that when the pipe line is bent at the joint, as indicated by broken lines in Fig. 1, one of the male hitch elements 9 still remains seated within the apex 14 and therefore prevents relative rotation between the pipes. In Figs. 1 and 1A the three sets of hitches are separately identified with the letters A, B and C, the hitch A being located in a horizontal axial plane and the hitches B and C being disposed 120° on either side thereof. When the pipe 2 is angled upwardly, as shown in broken lines, the male hitch element 9 of the hitch assembly C remains in its seat; i. e. the apex of its associated female hitch element, and the female hitch elements of the other two hitch assemblies A and B are moved to carry their apexes clear of their cooperating male hitch elements 9. The axis of the swinging movement of pipe 2 lies at the intersection of a vertical plane, cutting the shoulder 6, and in a horizontal plane extending through the contacting portion of the hitch assembly C, this axis being indicated at 0 in Fig. 1. The upward swinging movement of the pipe 2 about the axis 0 therefore carries the female hitch members 10 of the hitch assemblies A and B through arcs about the axis 0. This movement is permitted to take place without undue friction, by virtue of the fact that the arcuate side portions 12 and 13 each has a radius of curvature approximately equal to or less than their shortest radius of movement, which is the distance of 0 from the longitudinal axis of the pipe 1. Therefore the male hitch element 9, as clearly shown in the dotted line position of Fig. 1, follows freely along the arcuate surface 12 of the female hitch member. The described movement of the pipe 2 carries the male hitch element 9 of the hitch assembly B nearly straight away from the apex of its cooperating female hitch element, the surface of the pipe approaching the inner end of the male hitch element 9 during the movement.

No matter in which direction the pipe 2 may be bent or angled with respect to pipe 1, the male hitch element 9 will remain in the apex of its associated female hitch element in that one of the three hitches that is nearest to the outside of the bend in the pipe line. In Fig. 1A, if the pipe 2 were swung horizontally to the left, the movement would hinge on the two hitches B and C. On the other hand, if it were swung to the right, the movement would hinge on the hitch A.

I have found that the swinging movement between one of the male hitch elements 9 and the arcuate side 12 or 13 of its associated female hitch member has a minimum radius under the conditions shown in Fig. 1; i. e. when the plane of bending is perpendicular to the plane containing the hitch under discussion. Hence by making each of the female hitch members 10 identical with the female hitch member in the hitch assembly A, in which the arcuate section 12 is drawn on a maximum radius about the horizontal axis 0, assurance is had that there will be no binding between the male and female members of the hitches under any conditions of use.

The use of two or more—preferably three—hitches instead of only one, substantially reduces the extent to which the inner end of the pipe 2 is withdrawn when the coupling is bent. Thus as shown in the broken line position of Fig. 1, only the lowermost portion of the extreme end of pipe 2 is retracted from the normal position. In other words, bending of the joint is permitted by movement of a portion of the male pipe farther into the female pipe but with very little retraction of any part of the end of the male pipe. This is desirable since it permits normal positioning of the inner end of the pipe 2 relatively close to the tip 5 of the rubber gasket.

An infinite number of variations and adaptations of the particular construction shown in Figs. 1 and 1A can be employed without departing from the principles there involved. One such adaptation is that shown in Figs. 2 and 2A, in which the female hitch members are positioned on the female pipe and the male hitch members on the male pipe, in effect a reversal of the hitch parts as compared to the structure of Fig. 1. The male hitch members 20 may be constituted by the radially outwardly projecting ends of L-shaped rods 21 having one each of their legs lying against and welded to the male pipe member 2, or they may be I-shaped and radially secured at their inner ends to the male pipe member 2.

In the adaptation shown in Figs. 2 and 2A, each female hitch member 22 consists of a flat plate member of approximately wedge-shape, having downturned flanges 25 which constitute the female hitch element proper. The flange portions 25 are welded to the female pipe member 1 at their points of contact therewith. The flange 25 has a window 26 therein to permit entry of the cooperating male hitch members 20.

In operation, when the pipe 2 is swung upwardly, as shown in broken lines in Fig. 2, the pipe hinges about the hitch assembly in position C (Fig. 2A), and the male hitch members 20 of the hitches A and B swing about the axis O' which lies in the plane of the shoulder 6, but is positioned lower than the axis O in Fig. 1, because in the construction of Figs. 2 and 2A, the point of contact between the elements of each hitch is positioned radially farther from the longitudinal axis of the pipe than with the construction shown in Figs. 1 and 1A.

Because of the reversal of the hitch members with reference to the coupling members of Fig. 2, the inner surfaces of the side of the female hitch element are concave, instead of convex as in the construction of Fig. 1.

Because of the fact that the cooperating surfaces of the hitch elements in Figs. 2 and 2A are spaced farther from the longitudinal axis of the pipe than in the structure of Figs. 1 and 1A, the end of the pipe 2 will swing farther into the pipe 1 in response to a given bending movement, and it is less desirable in this respect.

The third modification of the invention, shown in Figs. 3, 3A and 3B, combines the advantages of using two or more hitch assemblies with the advantages disclosed in my prior Patent 2,132,769 of positioning the contacting surfaces of the hitch members in the transverse plane through the shoulder 6. Thus the female hitch members 30 are welded to the female pipe 1 and are provided with substantially cylindrical seating surfaces 31 for receiving the male hitch elements 32, which in this instance are constituted by the radially inturned ends of rods 33 welded to the pipe member 2 and extending longitudinally and outwardly a sufficient distance for the inner ends of the male hitch elements 32 to clear the lip 7 of the pipe 1. In the construction of Fig. 3 the pipes hinge about the hitch assembly nearest the outside of the bend, exactly the same as in Figs. 1 and 2, but by virtue of the fact that the hitch elements are positioned in the plane of the shoulder 6, the remaining male hitch elements move more nearly straight away from their associated female hitch elements. However, in this construction it is desirable to form the side 34 of the female hitch member 30 tangent to male hitch elements 32 and on the shortest radius of movement of male hitch elements 32 which is a radius about the axis O'' lying in a horizontal plane extending through the point of contact of the hitch assembly C, and form the inner surface of the side 35 convex and tangent to male hitch elements 32, and on a radius from the axis O''' defined by the intersection of a horizontal plane through the contact point of hitch B with the transverse plane through the shoulder 6. The female hitch elements of the hitch assemblies B and C are identical with those in the hitch assembly A, described in detail.

Although for the purpose of explaining the invention certain specific embodiments thereof have been described in substantial detail, it is to be understood that various changes can be made in the particular construction shown without departing from the invention, which is to be limited only to the extent set forth in the appended claim.

I claim:

In a flexible pipe coupling comprising a female member having an annular, inwardly projecting shoulder constituting a guiding orifice, a male member adapted to enter said orifice and have swinging movement in an axial plane of said female member, and flexible sealing means for effecting a seal between said members in a plurality of angular positions thereof; hitch means for mutually supporting said members against separating movement, said hitch means comprising a plurality of circumferentially spaced male hitch elements on one member and a corresponding number of cooperating female hook-like hitch elements secured on the other member in substantially equally spaced relation around the periphery of said other member, said female hitch elements including a portion which is approximately V-shaped, and all said male hitch elements including an elongated shank and a radially extending portion at one end thereof capable of simultaneously fitting in the apexes of their associated female hitch elements in mutually interhooked relation when said two members are in axially aligned position, the two sides of the V-shaped portion of each female hitch element diverging from each other at an angle such that the coupling can be bent, interhooked in any direction while retaining the male hitch element that is closest to the outside of the bend in the apex of its associated female hitch element.

JOHN W. WALLIS.